United States Patent [19]

Dani

[11] 4,275,099
[45] Jun. 23, 1981

[54] METALIZED POLYESTER RESIN LAMINATE

[75] Inventor: Mahesh J. Dani, Newtown, Pa.

[73] Assignee: Dunmore Corporation, Newtown, Pa.

[21] Appl. No.: 91,367

[22] Filed: Nov. 5, 1979

[51] Int. Cl.³ .................... B60R 13/00; B60R 21/14; C09J 5/04

[52] U.S. Cl. ........................... 428/31; 156/315; 156/331.4; 293/128; 428/416; 428/422; 428/424.6; 428/424.4; 428/458; 428/463; 428/480; 428/483

[58] Field of Search ............... 260/45.95 F; 293/1, 293/128; 156/315, 331; 428/31, 458, 424.4, 424.6, 416, 422, 463, 480, 483

[56] References Cited

U.S. PATENT DOCUMENTS

| | | | |
|---|---|---|---|
| 3,440,129 | 4/1969 | Anselm | 428/31 |
| 3,494,075 | 2/1970 | Kunevicius | 49/462 |
| 3,531,348 | 9/1970 | Kunevicius | 156/164 |
| 3,538,055 | 11/1970 | Camilleri et al. | 428/424.6 |
| 3,577,211 | 5/1971 | Wilson | 260/45.95 F |
| 3,681,180 | 8/1972 | Kent | 428/31 |
| 3,687,502 | 8/1972 | Loew | 293/1 |
| 3,881,042 | 4/1975 | Ungerer | 428/67 |
| 3,914,482 | 10/1975 | Sawa et al. | 428/31 |
| 3,922,460 | 11/1975 | Jackson | 428/31 |
| 3,935,164 | 1/1976 | Spivack | 260/45.95 F |
| 3,949,134 | 4/1976 | Wildorf | 428/458 |
| 3,959,538 | 5/1976 | Loew | 428/31 |
| 3,970,498 | 7/1976 | Loew | 428/31 |
| 3,982,780 | 9/1976 | Keith | 293/1 |
| 4,010,297 | 3/1977 | Wenrick | 428/31 |
| 4,081,504 | 3/1978 | Wenrick et al. | 428/31 |
| 4,208,465 | 6/1980 | Chang | 428/416 |

*Primary Examiner*—William R. Dixon, Jr.
*Attorney, Agent, or Firm*—B. Max Klevit

[57] ABSTRACT

A laminate, particularly useful for application to resin extrusion strips applied as trim molding to sides and doors of automobile bodies, is formed of a surface metalized polyester resin film bonded to a vinyl resin sheeting by an in-situ formed polyester-isocyanate adhesive.

36 Claims, 5 Drawing Figures

METALIZED POLYESTER RESIN LAMINATE

BACKGROUND OF THE INVENTION

1. Field of the Invention

The present invention relates to thin laminate structures comprising a film layer of metalized resin, which laminate structure is to be exposed in use to extremes in weather environment. It is particularly concerned with such laminates employed in protective and decorative trim molding strips applied to doors and side panels of automobile bodies and to edges of automobile doors.

2. Prior Art

Within about the past decade, metal molding strips employed as decorative or protective ("rub-rails") trim on the doors and side panels of automobiles have been largely replaced by plastic extrusions. Typical extruded moldings and edgings for application to the sides of automobiles and to the edges of the doors respectively are well known in the art as shown for example in the U.S. Pat. Nos. 3,440,129; 3,494,075; 3,531,348; 3,681,180; 3,687,502; 3,881,042; 3,914,482; 3,922,460; 3,970,498; 3,982,780; 4,010,927. Certain of the listed patents, among others, disclose plastic extrusions provided with a laminated layer comprising a metalized or metal-coated resin film. The typical structure widely employed for such application is formed of a three-ply laminate which generally is comprised of an aluminized polyester (such as aluminized "Mylar") film of about 0.5 mil thickness, adhesively bonded to an outer polyvinyl fluoride protective film of about 1 mil thickness. The opposite side of the metalized polyester film is adhesively bonded to a base layer of a virgin vinyl resin. This tri-laminate is applied to a running length of the extruded molding strip generally comprised of a virgin vinyl resin. The tri-laminate may be heat fused to the extruded strip or may be further provided with a backing of suitable adhesive to enhance or facilitate bonding to the resin extrusion. One form of such tri-laminate is disclosed in the U.S. Pat. No. 3,982,780, Example 2.

While tri-laminates of the type above described are widely used commercially, these as well as other proposed laminate structures have been found to present frequent problems, particularly from the standpoint of peeling or delamination. Such delamination tendency is at times already observed on standard testing of samples of the laminate or of the finished extrusion strip to which the laminate is applied, when the sample is subjected to prescribed weather environment conditions for indicated time periods. Even such products that are deemed acceptable in having successfully passed the prescribed tests, are in many instances later found defective and subject to subsequent complaints by automobile users and dealers. Such loss of bonding of the laminated molding strip often results from seepage of water between layers of the laminate, particularly between the metalized surface and the next adjacent layer. Apparently, the contained water penetrating the laminate is caused to evaporate when exposed to the sun's radiant heat and thus tends to break the bond between the strata. In other instances breaks in the continuity of the surface film of the molding strip as a result of impact or scratching, expose areas at which delamination may be initiated.

Among the objects of the present invention, therefore, are to provide an improved laminate structure comprising a metalized resin film layer, designed to overcome or largely mitigate the problems hitherto encountered in the use of such laminates.

SUMMARY OF THE INVENTION

In accordance with the present invention, a novel metalized resin film—containing laminate of improved weathering properties and enhanced resistance to delamination is obtained by employing as an adhesive bond between said film and the film layer next adjacent the metalized surface, a specially developed in-situ formed polyester-isocyanate polyurethane. The preferred laminate of the present invention comprises a clear transparent polyester resin film having on one side thereof a thin coating of vacuum deposited aluminum metal and on its opposite side, a clear weather resistance coating of a polyester resin preferably containing ultraviolet inhibitor. The metal coated surface of the film is bonded to a vinyl resin film by the in-situ formed thermosetting adhesive bond comprising the polyurethane formed by the reaction of the isocyanate with hydroxy groups of the polyester polyol. To enhance the strength of the bond between the metalized surface and the polyurethane adhesive layer and thus strengthen the overall bonding of the laminate layers, a thin priming layer is applied to the metalized surface before application of the urethane adhesive composition.

BRIEF DESCRIPTION OF THE DRAWINGS

The operation of the invention will be understood and its several advantages appreciated from the detailed description which follows, read in connection with the accompanying drawings, wherein.

DETAILED DESCRIPTION OF THE INVENTION

Figure 1:
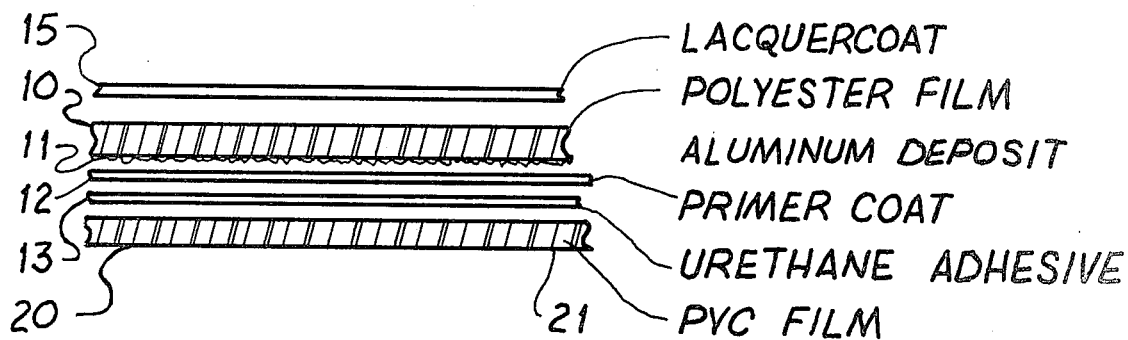
FIG. 1 is an exaggerated schematic representation of the preferred laminate showing the several layers in detached form. The illustrated thicknesses of the component layers are not scaled in proportion to actual size.

FIG. 1 of the drawings shows the component successive layers of the preferred bilaminate structure of the present invention, the thickness of the several component layers being highly exaggerated and not scaled to relative dimension. As shown in FIG. 1, the laminated structure comprises a preformed film of polyester resin 10 and a preformed film of vinyl resin 20. The polyester film may be of about 50 to 200 gauge thickness (12 to 50 microns), preferably 12 to 25 microns, and has thereon a substantially uniform vacuum-deposited coating of vaporized aluminum, indicated at 11, of desired thickness, which may preferably be in the range of 100 to 200 Angstroms.

To improve bonding of the metalized surface to the next adjacent adhesive layer, the metalized surface is coated with a primer composition 12, which is an acid-modified vinyl chloride copolymer in suitable solvents, said polymer preferably being cross-linked. To the thus primed surface there is next applied the adhesive coating 13, the composition of which is an important feature of the present invention. The adhesive layer 13, which will be more specifically hereinafter described, is a polyurethane formed from selected polyester polyols dissolved in suitable organic solvents and selected polyisocyanates in controlled proportions.

The outer surface of the polyester film 10 in the embodiment of FIG. 1 is coated with a weather resistant transparent lacquer 15 capable of providing a protective coating for the metalized polyester film 10, said lacquer containing U.V. inhibitor.

The under surface 21 of the vinyl film may be provided with a dried coating of a suitable adhesive, if so desired, to facilitate or improve bonding between the laminate and the vinyl extrusion strip. The use of the adhesive at 21 may not always be necessary since the vinyl film of the laminate can be fuse bonded to the vinyl extrusion molding and obtain good adhesion thereby.

Aluminized polyester film and methods for its production are well known in industry. Various commercial methods for production thereof are described in Modern Plastics Encyclopedia (1970–1971, at pages 710 and following). In the preferred method for production of the metalized polyester film 10, 11, employed in the laminate of the present invention, the aluminum (99+%  pure) held in a heated crucible in the form of pellets or the like, is vaporized in a high vacuum chamber by resistance or induction heating. Running lengths of the polyester resin film are passed through the chamber so that one surface of the film is exposed to contact with the vaporized metal at a running rate to deposit a uniform layer of the metal onto the film at a thickness of 100 to 200 Angstroms, while the opposite side of the film is subjected to cooling by contact with a cooling cylinder, to effect condensation of the aluminum on the metalized surface. The polyester film is a linear condensation product of a glycol and an unsaturated dibasic carboxylic acid, preferably poly- (ethylene terephalate), having a thickness in the preferred range of about 10 to 25 microns. Suitable commercial polyester film that can be employed include those marketed as "Mylar" (duPont) and "Melinex" (I.C.I. Ltd.).

After repressuring of the vacuum chamber to about atmospheric pressure the metalized film is removed from the chamber and the metal side is primed with a reactive vinyl resin solution preferably a solution of an acid-modified vinyl chloride vinyl acetate copolymer resin. The primer may be applied by a coating cylinder to a thickness in the range of about 0.01 to 1.0 microns, preferably 0.1 to 0.3 microns. Any of the usual organic solvents for such modified vinyl resin may be employed, typically methylethyl ketone (MEK), methyl isobutyl ketone (MIBK) or mixtures of these together.

The function of the primer is to enhance the adhesion of the aluminum coated surface to its support as well as to strengthen the adhesive bond between the metalized surface and the next applied polyurethane adhesive compostion. The presence of the carboxyl functionality in the acid-modified polyvinyl chloride serves this purpose. While not absolutely essential in practice of the present invention, optimum results are obtained by the incorporation of cross-linking agents in the primer composition. Among the typical cross-linking agents that can be so employed are included: solutions of organic polyisocyanates, epoxidized vinyl compounds, epoxy resin compounds or mixtures among these or with other cross-linking agents. Among the commercially available vinyl resin solutions that can be employed in the primer composition reference is made to "Bakelite Vinyl Solution Resin VMCH" (Union Carbide) and mixtures of the VMCH with other vinyl resins in solution such as VMCC and/or VMCA (Union Carbide). VMCA is a vinyl chloride acetate copolymer modified with 2.2 to 2.5% by weight maleic acid and containing 79 to 82% by weight polyvinyl chloride. VMCH is a similar copolymer of somewhat higher molecular weight than VMCA, comprising 85 to 88% by weight polyvinyl chloride and 0.8 to 1.2% maleic acid. VMCC is a copolymer similar to VMCH comprising 81.5 to 84.5% by weight of PVC and 0.8 to 1.1% maleic acid.

Among the commercially available cross-linking agents of these several type noted above are:

Polyisocyanates:
  Desmodur IL (Mobay)—a polyisocyanate of 16 to 17% NCO content having an average equivalent weight of 525; dissolved in butyl acetate.
  Mondur CB-75 (Mobay)—an aromatic polyisocyanate adduct of 12.5 to 13.5% NCO content having an average equivalent weight of about 325; dissolved in ethyl acetate.

Epoxidized vinyl resins:
  VERR (Union Carbide)—an epoxidized vinyl chloride polymer solution comprising 78% PVC and 1% oxirane oxygen. The cross-linking reaction is catalyzed with uranyl nitrate.

Epoxy resins:
  Epon 828 (Shell)—a liquid epoxy resin having an epoxy equivalent of 185 to 192 and a viscosity of 110 to 150 poise at 25° C.

A typical primer composition employing VMCH may comprise about a 12.6% by weight solution of the resin in toluol and methyl ethyl ketone (80–20), having a viscosity in the order of about 16 secs. (#2 Zahn cup). As cross-linking agent an epoxy resin compound is preferred such as Epon 828, together with tertiary amine and organo-tin catalysts to promote the cure.

The primer solution is applied and dried at temperature as in the range of about 200° to 260° F. (140°–145° C.), depending in part on the composition of the particular primer selected, the presence or absence of cross-linking agents and the particular cross-linking agents employed.

To secure good bonding adhesion between the primed metalized surface of the polyester resin film and the vinyl film 20, an adhesive coating is applied to the primed surface. The novel composition of the adhesive here employed is an important factor contributing to the advantageous properties exhibited by the laminates of the present invention. The adhesive coating applied comprises an organic solution of components forming in situ a thermosetting polyester-urethane. The solution comprises as one of the reacting components a hydroxy polyester formed by condensation of a polyhydric alcohol particularly a glycol such as butanediol and/or neopentyl glycol with isophthalic and/or terephthalic acid or mixtures of these glycols and/or acids in controlled ratios, providing a copolymer of maximum possible heat resistance while still maintaining solubility in normal lacquer type solvents. The polyester desirably should have reactive hydroxyl and a softening point in excess of about 100° C. after evaporation of solvents. To react with the hydroxyl polyester in the adhesive coating there is added thereto a mixture of certain organic polyisocyanates and suitable tertiary amine catalyst.

Preferred catalysts include dimethylethanolamine and diethylethanolamine.

Among the preferred polyisocyanate mixtures is one comprising both an aromatic triisocyanate adduct and an aliphatic triisocyanate. The ratio of aliphatic triisocyanate to aromatic triisocyanate may be in the range of between about 5:95 to 30:70, with the preferred ratio being about 15 to 85. The polyisocyanates and hydroxy polyester are dissolved in organic solvent employing a weight ratio of hydroxy polyester to isocyanates up to about 4:1. Generally the higher the percent of polyisocyanate the better the performance of the formed adhesive (such as heat resistance), but with a high content of the isocyanates processing of the adhesive becomes more difficult, particularly from the standpoint of shorter pot life. The applied adhesive, in the presence of tertiary amine catalyst of moderate activity, does not develop its ultimate properties until final cure by standing for a week or more after lamination, depending on humidity and other environmental conditions.

A commercially available aromatic triisocyanate that may be employed in the described adhesive coating (designated 13) is "Mondur CB-75" (Mobay Chemical Co.) formed by reacting three moles of tolylene diisocyanate with one mole of trimethylol propane, and dissolving the product in ethyl acetate (about 75% solids in solution). The product has an average equivalent weight of 325 and an NCO content of 12.5 to 13.5%. A commercially available aliphatic triisocyanate that may be employed is "Desmodur N-75", which is supplied as a 75% solids solution in equal parts of ethyl glycol acetate and xylene. This product has an average equivalent weight of 255 and an NCO content of 16 to 17%. It may be formed by reacting three moles of hexamethylene diisocyanate with one mole of water.

The preferred hydroxy polyester resin employed in the adhesive composition (13) is one having an acid/OH ratio of less than 0.5, wherein the hydroxyl number is preferably above 3 and up to 10, and a maximum acid number of up to 2.0, preferably below 1; best below 0.2. The polyester resin solution in Toluol/MEK (50/50), before addition of the polyisocyanate solution, preferably should have a Brookfield viscosity in the range of 120 to 180 cps, at 25° C.

The polyester-isocyanate adhesive coating 13 may be applied to the primed surface 12 by roller coating at a dry thickness of about 5 to 10 microns and dried at temperatures in the order of 150° to 250° F. (65° to 125° C.). The laminate structure, now comprising the layers 12 and 13 coating the aluminized surface 11 of the polyester film 10, is press laminated to the vinyl film 20 at 175° to 350° F. (80° to 175° C.). The vinyl film employed is that commonly used for automobile body trim laminates and may have a thickness in the order of about 2 to 8 mils (50 to 200 microns). The commercially available vinyl film commonly recommended for laminates used in automobile body trim is a monomer plasticized polyvinyl chloride having a Shore durometer "A" hardness of 75 to 100+. The plasticizer generally employed for such film essentially is an alkyl phthalate, such as isooctyl phthalate, applied at a ratio of about 24 parts per hundred parts resin.

The vinyl film 20 may be directly bonded to the vinyl extrusion strip by heat fusion. If desired, however, a dry heat seal adhesive layer may be applied to the underside 21 of the vinyl film 20 to facilitate or enhance such bonding. For this purpose any of the known heat-softening adhesive compositions for vinyl-vinyl bonding may be used. The adhesive layer, if used, may be applied to the underside of the vinyl film 20 at a thickness in the range of 2 to 3 microns.

The preferred lacquer coating 15 applied to the outer side of the polyester film 10, comprises an organic solution of a polyester resin, since such lacquer has excellent adhesion properties when applied to polyester film and provides a highly weatherable protective coating. An ultraviolet inhibitor is incorporated in the lacquer solution, which may be any one of the known organic U.V. stabilizers, preferably from among U.V. adsorber compounds containing a benzotriazole or benzophenone nucleus. Typical examples include: 2,4 dihydroxy benzophenone; 2,2' dihydroxy; 4,4' dimethoxy benzophenone; 2,2,4,4' Tetrahydroxy benzophenone; 2 hydroxy-4-methoxy benzophenone; 2,2' dihydroxy-4-methoxy benzophenone. The more preferred benzophenone compounds are those containing a hydroxyl group ortho to the oxo linking group on at least one of the benzene rings and in which one or both of the o-hydroxy substituted rings may further contain a hydroxy or methoxy group in the paraposition. The preferred U.V. adsorber compounds correspond generally to the formula:

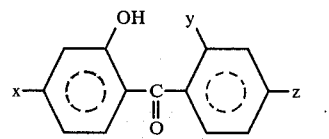

wherein x is OH or CH$_3$, y is H or OH, and z is H, OH or CH$_3$. Among the preferred commercially available U.V. inhibitors is "Uvinul D-50" (GAF), which is 2,2', 4,4',-tetrahydroxy benzophenone, Any known solvent or mixture of organic solvents for polyester resin may be employed to dissolve the resin used in the lacquer coating 15. Excellent performance has been obtained when employing a solution of the resin in methyl ethyl ketone and toluene having a viscosity of 22 seconds (#2 Zahn cup). The U.V. adsorber constitutes 2 to 3 parts per hundred parts of the resin (W/W). The protective lacquer 15 may be applied to film 10 at a thickness of from above 1 to 2 or more microns and dried thereon by a flowing hot air stream at a temperature generally in the range of 105° to 125° C.

The obtained laminate is thus provided in the form of rolled webs having a thickness of from about 2.5 to 10 mils (0.06 to 0.25 mm.), which if desired, may be cut up into sheets or strips of desired dimension.

Figure 2:
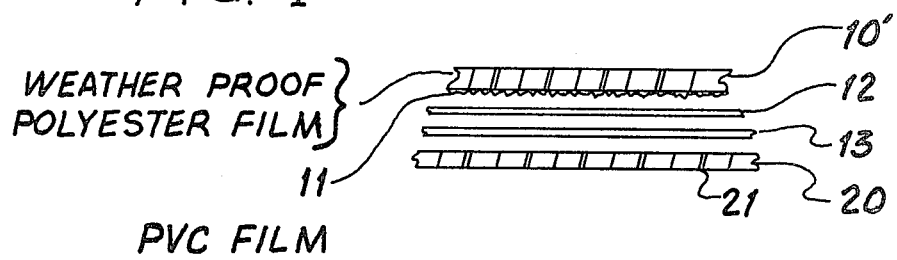
FIG. 2 is a similar representation of an alternative embodiment.

The components of the laminate structure depicted in the alternative embodiment of FIG. 2 are largely the same as those in FIG. 1 with the noted exception that in the FIG. 2 embodiment the lacquer coating 15 is omitted. If one employs as the outermost film 10' a weather-resistant polyethylene terephthalate such as one already containing ultra-violet inhibitor, in forming the laminate of the present invention, it is not necessary to apply a weather proof lacquer coating thereover. Such weather-resistant polyethylene terephthalate films are commercially available. Of course, if one desires nevertheless to apply such weather proofing lacquer coating to the surface of an already weather resistant polyethylene terephthalate film (10'), to satisfy customer demand or otherwise, the same may be practiced without departure from the present invention.

Figure 3:
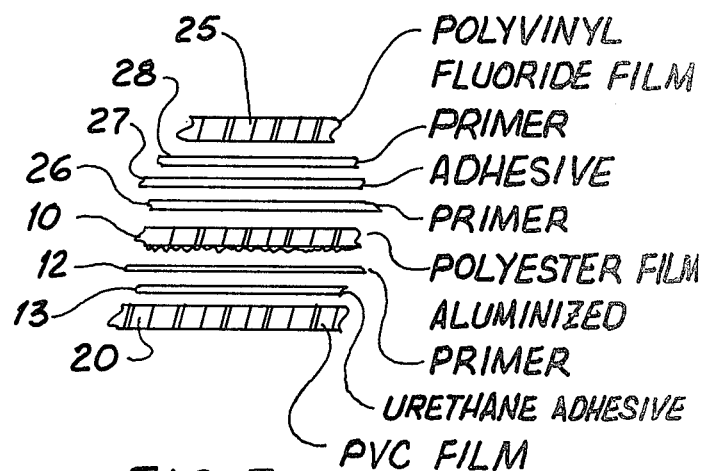
FIG. 3 is a similar representation of a further alternative embodiment depicting a tri-laminate instead of the di-laminate embodiments illustrated in FIGS. 1 and 2.

As hereinabove indicated, the present existing standard in the industry calls for a trilaminate wherein the outer exposed surface of the laminate is covered with a preformed protective film of polyvinyl fluoride ("Tedlar"). If so desired, the laminate of the present invention may be made in trilaminate form as depicted in the alternate embodiment of FIG. 3. Thus, as shown in FIG. 3, the metalized polyester film 10 or 10′ may be the same as that employed in the embodiments of FIGS. 1 and 2; however, since an overlying protective film layer is to be employed the polyester film 10 or 10′ may be at the thinner end of the range, as at about 50 gauge thickness (12 microns). The successive coatings 11, 12, 13 and the vinyl film 20 may be the same as in the previously described embodiments. To secure good bonding between the non-metalized surface of the polyester film 10 and the superimposed Tedlar (polyvinyl fluoride) film 25 an adhesive and primer are sandwiched between the underside of the Tedlar film 25 and the upper face of the polyester film 10. Thus, as shown in FIG. 3, a primer composition 26 is applied to the exposed non-metalized surface of the polyester film 10 which was already laminated to the vinyl film 20 as previously described in embodiments of FIGS. 1 and 2. An adhesive coating 27 is next applied over the primer 26, and a second primer 28 is applied between the adhesive 27 and the under surface of the Tedlar film 25. The primer 28 optionally may be applied to the under surface of the Tedlar film or directly to the surface of the adhesive layer 27.

The composition of the primers 26 and 28 will depend upon the particular type of adhesive employed at 27. The preferred adhesive for bonding the Tedlar film to the polyester film 10 is the same as that employed in bonding the aluminized surface of the polyester film to the polyvinyl film 20. If such in-situ formed polyurethane adhesive is employed at 27, primer 26 may be a thinned version of lacquer coating 15, preferably thinned with 50/50 mixtures of DMF/Ethylene glycol monoethyl ether acetate and catalyzed with isocyanates such as CB-75 to a degree of between 5 to 25% of the polyester solids. The dry thickness of this primer should be in the range of 0.05 to 2 microns. Applied with a roller coater, it should be dried at elevated temperatures of 200° to 250° F.

The primer employed at 28 may be commercially available polymers characterized by good adhesion to 25, polyvinyl fluoride (Tedlar) film. Particularly useful are the acrylic based coatings and adhesives available from the fabrics and finishes division of DuPont. The primer 28 is applied to treated surface of "Tedlar" film via roller coating and dried at temperatures of 175° to 250° F. The dry thickness of this primer should be in the range of 0.05 to 4 microns.

Figure 4:
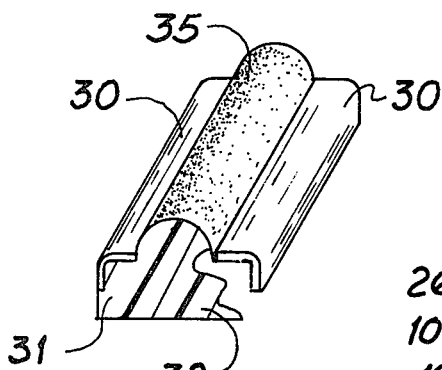
FIG. 4 is a perspective view of one form of automobile trim strip showing the application of the laminate to an extrusion strip, a portion of said strip being broken away.

FIG. 4 of the drawings shows the application of the laminate to a length of vinyl extrusion to employed as a side molding on the body of an automobile. In the illustrated embodiment the strips of laminate 30 are applied at the sides 31, 32 and only to part of the adjacent upper (outer) surfaces of the vinyl extrusion, leaving an intermediate exposed portion 35 free of laminate. The particular configuration of the molding strip may vary with different automobile trim users or producers and is not claimed as part of the present invention.

Figure 5:
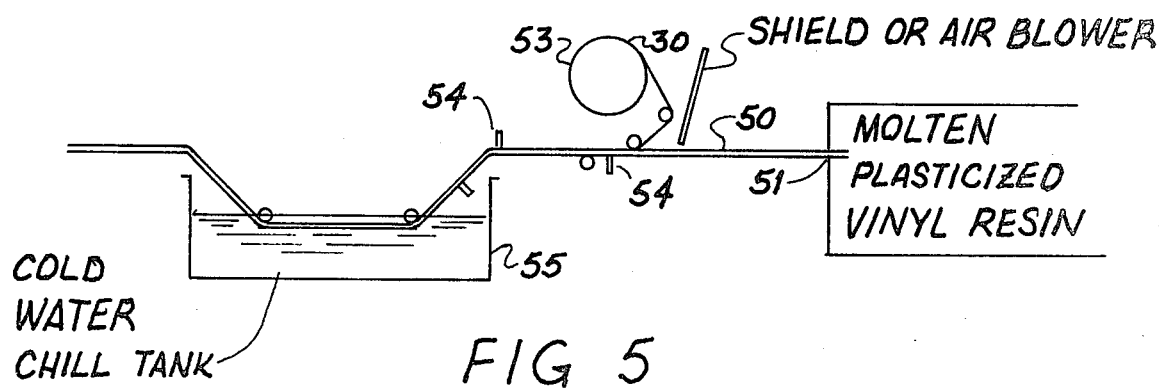
FIG. 5 is a schematic illustration of the manner of applying the laminate layer to an extruded plastic strip.

In a typical process for producing auto side trim molding the metalized laminate strip is applied to the vinyl extrusion in an in-line continuous process as the molten vinyl extrusion leaves the extrusion die. Thus, as illustrated in FIG. 5, the plasticized vinyl strip 50 is extruded in molten form through a die 51 of desired cross sectional shape. The laminated sheet 30 is unwound from a carrier roll 53 and fed onto the surface of strip 50 while the latter is still in tacky condition. Conventional means are provided, as schematically indicated at 54, for shaping and tucking the laminate to fit the portions of the vinyl extrusion to which it is being applied. As heretofore indicated, the laminate sheet 30 comprises at its underside, to be bonded to the vinyl extrusion, the vinyl film 20 (FIG. 1) or may be undercoated with an adhesive layer. After the desired attachment of the laminate 30 to the vinyl extrusion strip 50 is had, the bond therebetween is fixed by passing the composite through a chill tank 55 containing cold water or other suitable chilling medium.

Typical molding strips for use as automobile side trim having substantially the shape illustrated in FIG. 4 are well known in the art, as shown in U.S. Pat. Nos. 3,959,538; 3,982,780 and 4,010,297. As therein indicated, these may have different shapes as styled by the automobile body manufacturers and may have the metalized laminate applied to all or part of the exposed outer surface of the molding strip.

While the use of the laminate of the invention has been more particularly described in connection with side molding trim for automobiles, it will be understood that the invention is not limited thereto. The laminates of the invention may also be used on vinyl resin strips employed as protective edge guards on the doors of vehicles as well as a component of moldings used in window framing and windshield trim.

The following example illustrates production of a preferred two ply laminate intended for application to a vinyl extrusion strip employed as a side trim for automobile bodies and doors.

EXAMPLE

A running length of clear transparent biaxially oriented polyethylene terephthalate film (Melinex 442; I.C.I. Americas) of 23 micron thickness is passed through a vacuum metalizing chamber at a rate to deposit aluminum metal on one surface of the film at a thickness of about 150 angstroms. The vacuum is maintained at below 5 microns Hg and the aluminum in the chamber is heated by induction to a point at which a steady rate of evaporation of the aluminum is maintained. Condensation of the aluminum on the exposed surface of the film is effected by contacting the opposite face thereof with a cooling cylinder at 45° F. (approximately 7° C.).

The metalized surface of the film is coated with a mixture comprising a solution of VMCH in toluene and methyl ethyl ketone (70–30) to which there was added per 100 parts by weight of the dry VMCH: 30 parts of Epon 828, 0.025 parts of tertiary amine catalyst and 0.014 parts of stannous octoate. The mixture has a viscosity of 16 seconds (#2 Zahn cup) at 12.6% solids and it is applied with a 200 Quad gravure cylinder at a dry thickness of about 0.2 microns and cured on a conditioning drum at 280° F. (approximately 138° C.).

The polyurethane-forming adhesive composition is applied over the primed surface of the metalized Melinex as a layer of about 7 micron dry thickness. The adhesive is usually applied at 30% solids with a 60 line trihelical gravure cylinder at a viscosity of 17 seconds (#3 Zahn cup). The solvent system consists of equal parts of methyl ethyl ketone and toluene; up to 10% cyclohexanone may be used if higher boiling solvents are desired. The primary resin is a hydroxy polyester in a range of 10,000 to 40,000 molecular weight having a hydroxyl number of 3 to 10 and an acid/hydroxyl ratio of 0 to 1.0. Per 100 dry parts of this polyester polyol are added: 6.25 parts of Desmodur N-75 and 35.5 parts of Mondur CB-75; and 0.85 parts of dimethylaminoethanol as a tertiary amine polyurethane catalyst.

The adhesive coated film was laminated to an opaque film of plasticized PVC of 8 mil (approximately 2 mm) thickness (Stauffer, Regal 683).

As a weatherproofing protective coating there was applied to the exposed non-metalized face of the Melinex film a lacquer coating of a weather resistant polyester resin, with an acid number of approximately 50 and the coated laminate oven dried at 160° to 225° F. (71° to 107° C.). The resin solution comprises 30% polyester resin dissolved in a solvent mixture composed of 95% MEK/Toluol (1:3) and 5% Cellosolve acetate, having a viscosity of 24 seconds (#2 Zahn cup); and contained about 2.7 parts of Uvinol D-50 per hundred parts of polyester resin solution.

The laminate thus prepared can be directly bonded to a hot extruded vinyl strip to be used as automobile trim. If the user so desires an adhesive may be applied to the undersurface (21) of the plasticized PVC film of the laminate before bonding the laminate to the vinyl extrusion strip. For that purpose one may employ a composition comprising dissolved medium molecular weight methyl methacrylate acrylic resin such as Elvacite grade 2009 or 2010 (Dupont), to which may be added known flatting agents.

What is claimed:

1. A process for the manufacture of laminated thin sheets having improved weathering properties which comprises bonding a metalized transparent polyester resin film to a polyvinyl chloride film sheet by an in-situ formed thermosetting polyurethane adhesive layer, wherein the metalized surface of said polyester film is primed with an applied coating comprising an acid modified vinyl chloride vinyl acetate copolymer.

2. The process as defined in claim 1 wherein said primer coating is applied as a solution in organic solvent.

3. The process as defined in claim 1 wherein said applied primer coating comprises as a cross-linking agent a liquid epoxy polymer having an epoxide equivalent of 185–192.

4. The process as defined in claim 3 wherein said primer coating further comprises at least one catalyst from the group consisting of tertiary amines and tin catalysts.

5. The process as defined in claim 3 wherein said primer coating further comprises catalytic amounts of tertiary amine and stannous octoate.

6. The process as defined in claim 1 wherein said polyurethane adhesive layer is formed by reaction in-situ of a polyester polyol with triisocyanate.

7. The process as defined in claim 6 wherein said in-situ reaction is carried out in the presence of a tertiary amine catalyst.

8. The process as defined in claim 1 wherein said polyurethane adhesive layer is formed in-situ by reaction of at least one polyester polyol with a mixture of a slow acting and a fast acting polyisocyanate.

9. The process as defined in claim 1 wherein said polyurethane adhesive layer is formed by reaction of a polyester polyol with a mixture of an aromatic triisocyanate and an aliphatic triisocyanate.

10. The process as defined in claim 9 wherein said in-situ reaction is effected in the presence of a tertiary amine catalyst and said mixture of triisocyanates comprises 5 to 30 parts of aliphatic triisocyanates to respectively 95 to 70 parts of aromatic triisocyanate.

11. The process as defined in claim 10 wherein said aromatic triisocyanate is one formed from reaction of tolylene diisocyanate with trimethylol propane.

12. The process as defined in claim 10 wherein said aliphatic triisocyanate is one formed by reaction of hexamethylene diisocyanate with water.

13. The process as defined in claim 1 wherein said polyurethane adhesive layer is formed by reaction of a polyester polyol with a mixture of polyisocyanates, comprising (1) an aromatic polyisocyanate formed from reaction of tolylene driisocyanate with trimethylolpropane and (2) aliphatic triisocyanate formed by reaction of hexamethylene diisocyanate with water.

14. The process as defined in claim 1 wherein said polyurethane adhesive layer is formed by reaction with organic isocyanate in organic solution, a polyester polyol compound formed by reaction of at least one polyhydric alcohol with a dicarboxy acid from the group consisting of isophthalic and terephthalic acids, said urethane-forming reaction being carried out in the presence of a catalytic amount of dimethylethanolamine.

15. The process as defined in claim 14 wherein said polyhydric alcohol is a glycol selected from the group consisting of butanediol, neopentyl glycol and mixtures of these.

16. The process as defined in claim 14 wherein the weight ratio of polyester polyol compound to isocyanates is in the range of 20:1 to about 2:1.

17. The process as defined in claim 1 wherein said polyurethane adhesive layer is one formed by reaction of polyisocyanate with a solution of a polyester polyol having an acid/OH ratio of not greater than 1.0 and a hydroxy number above 3.

18. The process as defined in claim 17 wherein said polyester polyol is one having an acid number below 2.0.

19. The process as defined in claim 17 wherein said polyester polyol is one having an acid/OH ratio of not greater than 0.2.

20. The process of forming laminated thin sheets having improved weathering properties which comprises (1) applying to a vinyl copolymer primed metal surface of an aluminized polyester film, an adhesive layer of a thermosetting adhesive formed in-situ by reaction of polyisocyanates in organic solution with a polyester polyol, said polyester polyol being one formed by reaction of at least one glycol from the group consisting of butane diol and neopentyl glycol, with at least one dicarboxylic acid from the group consisting of isophthalic and terephthalic acids; and (2) bonding the adhesive containing film to a polyvinyl chloride backing film at said adhesive layer.

21. The process as defined in claim 20 wherein said polyester polyol solution has a viscosity of about 17± seconds in a #3 Zahn cup.

22. The process as defined in claim 20 wherein said polyester polyol is one having an acid/OH ratio not greater than 1.0, and a hydroxy number above 3.

23. The process as defined in claim 20 wherein there is further applied to the opposite face of said polyester film a transparent protective lacquer coating comprising an organic solvent solution of a polyester resin containing an ultraviolet inhibitor.

24. The process as defined in claim 23 wherein said ultraviolet inhibitor is one corresponding to the general formula

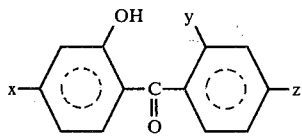

wherein x is OH or OCH$_3$, y is H or OH, and z is H, OH, or OCH$_3$.

25. The process as defined in claim 23 wherein said ultraviolet inhibitor is 2,2', 4,4'-tetrahydroxy benzophenone.

26. The process as defined in claim 20 wherein the reverse face of said polyvinyl chloride backing film is further treated by application thereto of a dry heat seal adhesive having a dried thickness of 1 to 3 microns.

27. The method of weatherproofing polyethylene terephthalate film having at one face thereof a vacuum applied coating of aluminum metal, which method comprises coating the non-metalized face of said film with a polyester resin lacquer composition containing a benzophenone ultraviolet inhibitor.

28. Polyethylene terephthalate film having at one face thereof a vacuum-applied coating of aluminum metal and the opposite face coated with a polyester resin lacquer composition containing as an ultraviolet inhibitor 2,2', 4,4' tetrahydroxy benzophenone.

29. The method of forming an ornamental auto trim molding strip which comprises bonding to at least a portion of the surface of an extruded vinyl resin die-formed strip a metalized polyethylene terephthalate film laminate, said laminate being formed by bonding the metalized surface of an aluminized transparent polyethylene terephthalate film to a vinyl film sheet by an intervening layer of in-situ formed thermosetting polyester-polyurethane adhesive; applying to the unattached exposed opposite face of said polyester film a protective lacquer composition comprising an organic solvent solution of a polyester resin containing ultraviolet inhibitor; the exposed reverse side of said vinyl film sheet of the thus formed laminate being bonded to said extruded vinyl strip.

30. A thin flexible laminated structure comprising a film of aluminized transparent polyethylene terephthalate bonded at the metalized surface thereof to a vinyl film sheet by an intervening layer of a cured thermoset polyester-polyisocyanate adhesive composition, the opposite exposed surface of said aluminized film being coated with a weather resistant protective lacquer comprising a polyester resin, containing ultraviolet inhibitor; said polyester-polyisocyanate adhesive composition comprising the reaction product of at least one triisocyanate reacted with a condensation copolymer formed from at least one glycol compound from the group consisting of butanediol and neopentyl glycol and at least one dicarboxylic acid from the group consisting of isophthalic and terephthalic acids.

31. The structure defined in claim 30 wherein said adhesive composition is the reaction product of said condensation copolymer with at least one slow reacting triisocyanate and at least one more rapidly reacting triisocyanate.

32. The structure defined in claim 30 wherein the metalized surface of said polyester film is treated with a thin layer of a priming composition comprising an acid-modified vinyl chloride-vinyl acetate copolymer.

33. The structure as defined in claim 32 wherein said copolymer of said priming composition is cross linked by epoxy resin.

34. An auto trim molding comprising an extruded vinyl strip having bonded on at least part of its surface an ornamental metal-simulating laminate as defined in claim 33.

35. An auto trim molding comprising an extruded vinyl strip having bonded on at least part of its surface an ornamental metal-simulating laminate as defined in claim 30.

36. A thin flexible laminated structure comprising a film of aluminized transparent polyethylene terephthalate bonded at the metalized surface thereof to a vinyl film sheet by an intervening layer of a cured thermoset polyester-polyisocyanate adhesive composition, the opposite surface of said aluminized film having bonded thereto a protective film of polyvinyl fluoride; said polyester-polyisocyanate adhesive composition comprising the reaction product of at least one triisocyanate reacted with a condensation copolymer formed from at least one glycol compound from the group consisting of butanediol and neopentyl glycol and at least one dicarboxylic acid from the group consisting of isophthalic and terephthalic acids.

* * * * *